United States Patent Office 3,546,339
Patented Dec. 8, 1970

3,546,339
STABLE DIMETHYL SULFOXIDE SOLUTIONS OF TETRACYCLINE ANTIBIOTICS FOR PARENTERAL USE
Lewis Joseph Leeson and Robert Arnold Nash, Spring Valley, and Lawrence Ritter, Suffern, N.Y., assignors to American Cyanamid Company, Stamford, Conn., a corporation of Maine
No Drawing. Continuation-in-part of application Ser. No. 215,766, Aug. 7, 1962. This application Sept. 6, 1968, Ser. No. 758,100
Int. Cl. A61k *21/00*
U.S. Cl. 424—227
10 Claims

ABSTRACT OF THE DISCLOSURE

Stable solutions of a tetracycline antibiotic which render high blood levels by the intramuscular route of administration, are prepared by complexing the tetracycline antibiotic with an alkaline earth salt of a weak organic acid in dimethylsulfoxide at an apparent pH of from 7 to 10.

---

This application is a continuation-in-part of copending application Ser. No. 215,766, filed Aug. 7, 1962 now abandoned.

This invention relates to an improved physically and biologically stable substantially anhydrous preconstituted solution of tetracycline antibiotics for parenteral administration and other therapeutic uses.

While tetracycline antibiotics have been extensively used orally, there is a need for preparations which can be administered parenterally. In the past this has created a considerable problem. Ordinary solutions of the tetracycline antibiotics in water or other solvents either have not proven to be of adequate stability or have not produced satisfactory blood levels and so it has been common practice to employ stable dry forms of the tetracycline antibiotics which must be reconstituted with solvents prior to use. This presents a considerable problem, since reconstitution must result in complete solution or otherwise there will be undissolved solids which are undesirable for injection. There is therefore a need for a preconstituted solution which can be kept in this form and used without the necessity of dissolution and which will produce satisfactory blood levels upon injection.

Various proposals have been advanced, such as refrigeration of solutions, which of course presents its own problems, and recently certain preparations in which the tetracycline antibiotic is complexed with alkaline earth metal salt have been used with polyhydroxy solvents such as glycols. In addition, dimethylacetamide and other lower aliphatic carboxamides, have been used in aqueous systems with alkaline earth metal salts. These solutions are unacceptable because of the low blood levels of tetracycline antibiotic produced after intramuscular administration. In the case of oxytetracycline stable solutions have also been prepared in esters of lactic acid. The present invention deals with improved preconstituted anhydrous solutions of the tetracycline antibiotics, which are not only stable but also produces satisfactory blood levels on intramuscular administration.

We have found that if the tetracycline antibiotic is complexed with alkaline earth metal salts of weak organic acids and dissolved in dimethylsulfoxide and the apparent pH adjusted to from 7–10 with the weak acid, very stable solutions result which in addition render high blood levels especially when given by the intramuscular route of administration.

According to this invention, the tetracycline antibiotics are complexed with alkaline earth metal salts of weak organic acids such as for example, calcium levulinate, calcium ascorbate, or the lactate, or the corresponding magnesium compound or mixtures thereof. These complexes form solutions in dimethyl sulfoxide of extraordinary stability, even under autoclaving conditions, and also give surprisingly good antibiotic blood levels by parenteral administration. Although other acids may be used in the invention, such as acetic acid, gluconic acid and glucoheptanoic acid, the aforementioned weak acids are preferred. Levulinic acid being especially preferred because of its wide range of application. An essential requirement is that the alkaline earth-acid salts must be soluble in the solvent. For example, calcium gluconate without special techniques is not soluble in dimethyl sulfoxide and in such form is not suitable. However, the magnesium salt is sufficiently soluble and can be used as such.

A further advantage of the present invention is that it may be used with any of the well known tetracycline antibiotics. Typical examples are tetracycline itself, chlorotetracycline, demethyltetracycline, oxytetracycline, demethylchlortetracycline, 7-dimethylamino-6-demethyl-6-deoxytetracycline, and the like, and mixtures thereof. In order to reduce the length of the specification the customary abbreviations for the tetracyclines will be used, such as TC for tetracycline, CTC for chlortetracycline, OTC for oxytetracycline, DMTC for demethyltetracycline and DMCTC for demethylchlortetracycline.

All of the preparations of the present invention exhibit an extraordinary phenomenon when tested by diluting with water. In a 1 to 1 dilution with water, there is a sharp decrease in apparent pH from alkaline to acid, due to the ionization of the weak acid in water. (All pH determinations were read on a pH meter equipped with calomel and glass electrodes. This test of sharp decrease in pH and dilution with water is an important identifying characteristic of the solutions of the present invention. This phenomenon is prevalent in the anhydrous solutions of the tetracycline antibiotics prepared according to this invention, which are found stable and capable of producing satisfactory blood levels.

It is an advantage that the ratio of alkaline earth metal to TC antibiotic is not critical. Stable solutions rendering satisfactory blood levels are obtainable in ratios from 1:1 to 7:1. While it is possible to prepare solutions having greater ratios than 7:1 these are not as desirable. The best compositions are in general found with ratios between 3:1 and 4:1 in the anhydrous systems and as high as 7:1 in aqueous systems. Mixtures of calcium and magnesium salts of a weak organic acid also render high blood levels and are preferred in many cases.

The apparent pH of the substantially anhydrous solutions of this invention is an alkaline side and may be between 7 and 10 with the best products generally falling between 7.5 and 8.6. The apparent pH is adjusted to the preferred apparent alkalinity by adding an amount of weak organic acid.

An amount of water or urea may be added to advantage without destroying the stability of the solution or decreasing blood levels. The addition of up to about 25% water or urea, for instance, will decrease the heat generated in the tissues after intramuscular administration.

It is also possible to incorporate certain other materials in the formulation such as local anesthetics such as Xylocaine and Versacaine and an antioxidant such as monothioglycerol, and the like.

The invention will be described in greater detail in conjunction with the specific examples in which the parts are by weight unless otherwise specified. The stability and blood level data appear after the examples. The following examples are provided for illustrative purposes and may include particular features of the invention, however, the examples should not be construed as limiting the invention, many variations of which are possible without departing from the spirit or scope thereof.

EXAMPLE 1

TC base 6 $H_2O$—888 mg.
Ca levulinate—1.012 g.
Dimethyl sulfoxide (50 mg./ml. of TC as the hydrochloride)—15 ml.

The calcium levulinate is dissolved in 10 ml. of dimethyl sulfoxide with the aid of a little heat. It is cooled to room temperature, after which the TC is added, with stirring. This is then treated with a little levulinic acid to the apparent pH of about 8.5 and then diluted to 15 cc. with dimethyl sulfoxide, and levulinic acid to maintain the final "apparent" pH at 8.5.

EXAMPLE 2

The procedure of Example 1 is followed except that magnesium levulinate is substituted for the calcium levulinate, producing the following formulation:

TC base 6 $H_2O$—888 mg.
Mg. levulinate—975 mg.
Dimethyl sulfoxide—15 ml.

EXAMPLE 3

The procedure of Example 1 is repeated except that the amount of dimethyl sulfoxide is 75 ml. and the salt used for complexing is calcium ascorbate. The formulation is as follows:

TC base 6 $H_2O$—4.44 g.
Calcium ascorbate—6.88 g.
Dimethyl sulfoxide—75 ml.

EXAMPLE 4

The procedure of Example 1 is repeated on a scale of 30 ml. using magnesium ascorbate. The formulation is as follows:

TC base 6$H_2O$—1.8 g.
Mg. ascorbate—5.0 g.
Dimethyl sulfoxide—30.0 ml.
Apparent pH=8.4.
1:1 aqueous dilution test pH=6.0.

EXAMPLE 5

The procedure of Example 1 is repeated to produce a 50 ml. batch, replacing the calcium levulinate with a mixture of calcium and magnesium levulinates. The formulation appears as follows:

TC base 6 $H_2O$—2.91 g.
Mg. levulinate—2.58 g.
Ca. levulinate—3.35 g.
Monothioglycerol—0.2 ml.
Levulinic acid—6.0 ml.
Dimethyl sulfoxide to 50.0.
Apparent pH=8.0.
1:1 aqueous dilution test—pH=5.5.

EXAMPLE 6

A formulation with CTC is produced by following the procedure similar to that of Example 1, replacing the TC with CTC and producing the following formulation:

CTC base—2.66 g.
Mg. levulinate—2.4 g.
Levulinic acid—2.4 ml.
Dimethyl sulfoxide to 50.0 ml.
Apparent pH=8.8.
1:1 aqueous dilution test pH=5.8.

EXAMPLE 7

The procedure of Example 6 is repeated with DMCTC producing the following formulation:

DMCTC base—2.66 g.
Mg. levulinate—2.48 g.
Levulinic acid—3.0 ml.
Dimethyl sulfoxide to 50.0 ml.
Apparent pH=8.5.
1:1 aqueous dilution test pH=5.9.

EXAMPLE 8

The procedure of the foregoing example is repeated with DMTC to produce the following formulation:

DMTC base—2.5 g.
Mg. levulinate—2.65 g.
Levulinic acid—3.2 ml.
Dimethyl sulfoxide q.s. to 50.0 ml.
Apparent pH=8.7.
1:1 aqueous dilution test pH=5.5.

EXAMPLE 9

The procedure of the preceding example is repeated using OTC to produce the following formulation:

OTC HCl—2.63 g.
Mg. levulinate—2.50 g.
Dimethyl sulfoxide—50.0 ml.
Apparent pH=8.22.
1:1 aqueous dilution test pH=6.3.

EXAMPLE 10

This example, which is prepared as is Example 1, illustrates an admixture of calcium and magnesium salts and the use of additional materials in the formulation such as urea, water, an anesthetic and an antioxidant. The formulation is as follows:

TC base 6 $H_2O$—3.48 g.
Mg. levulinate—3.08 g.
Ca. levulinate—4.04 g.
Monothioglycerol—.06 ml.
Versacaine HCl—1.2 g.
Urea—15.0 g.
Water—9.0 ml.
Dimethyl sulfoxide q.s. to 60.0 ml.

The apparent pH of this solution was 7.91. The pH after testing by diluting 1:1 with water was 5.61. This solution was stable.

EXAMPLE 11

The procedure of Example 10 is repeated, eliminating the urea. The pH change is as follows:
Apparent pH=8.1.
1:1 aqueous dilution test pH=6.0.

EXAMPLE 12

Example 12 was repeated, eliminating the sodium bisulfite and changing the proportion of magnesium and calcium levulinate to produce the following formulation:

TC base 6 $H_2O$—2.91 g.
Mg. levulinate—3.87 g.
Ca. levulinate—1.68 g.
Monothioglycerol—0.2 ml.
Levulinic acid—6.5 ml.
Dimethyl sulfoxide q.s. to 50.0 ml.
Apparent pH=8.2.
1:1 aqueous dilution test pH=5.5.

Examples 14 and 15 illustrate the formulations with different proportions of magnesium levulinate producing the following products.

EXAMPLE 13

TC base 6 $H_2O$—6.03 g.
Mg. levulinate—11.1 g.
Urea—25.0 g.
Concentrated HCl—0.5 ml.
Dimethyl sulfoxide to—100.0 ml.
Apparent pH=8.4.
1:1 aqueous dilution test pH=6.0.

EXAMPLE 14

TC HCl—5.25 g.
Mg.levulinate—11.1 g.
Urea—25.0 g.
Concentrated HCl—0.25 ml.
Dimethyl sulfoxide to—100.0 ml.
Apparent pH=8.8.
1:1 aqueous dilution test pH=6.7.

The foregoing table shows the drop in pH on testing by dilution with an equal amount of water which is a characteristic of the formulations of the present invention, and also shows their remarkably high stability under autoclaving conditions.

The following table illustrates the efficacy of the substantially anhydrous compositions of the present invention in producing high blood levels. For comparison a number of known compositions are included. With the exception of the first formulations all of the injections are in rabbits. The first formulation was tested in dogs.

TABLE 2.—SERUM CONCENTRATION OF TC ADMINISTERED VIA INTRAMUSCULAR INJECTION TO TEST ANIMALS

[5.0 mg./kg. from a preparation containing 50 mg./ml. TC antibiotic]

| Formulation ingredients | pH Undiluted | pH 1:1 dilution [1] | Serum concentration ($\gamma$/ml.), hours after injection | | | |
|---|---|---|---|---|---|---|
| | | | 1 | 4 | 7 | 24 |
| TC base, MgCl$_2$, propylene glycol | 8.5 | 8.8 | 0.51 | 0.53 | 0.52 | 0.38 |
| TC base, CaCl$_2$, urea, propylene glycol | 5.9 | 6.4 | 0.54 | 0.49 | 0.36 | 0.18 |
| TC base, Ca levulinate, urea, Tween 80, propylene glycol | 6.5 | 6.1 | 0.68 | 0.32 | 0.34 | 0.13 |
| TC base, Ca levulinate, niacinamide, Tween 80, propylene glycol | 6.5 | 6.1 | 0.65 | 0.36 | 0.33 | 0.14 |
| TC base, Ca levulinate, MgCl$^2$, urea, propylene glycol | 6.4 | 6.0 | 0.74 | 0.37 | 0.29 | 0.10 |
| OTC I. M., powder formulation [2] | [3] 2.0 | | 1.66 | 0.67 | 0.58 | 0.18 |
| TC I.M., powder formulation [2] | [3] 2.0 | | 1.48 | 0.87 | 0.53 | <.12 |
| OTC·MgCl$^2$·propylene glycol | 8.7 | 8.8 | 2.15 | 0.65 | 0.76 | 0.15 |
| TC base, Mg levulinate, dimethyl sulfoxide | 8.0 | 5.5 | 2.25 | 1.33 | 0.88 | <.14 |
| TC base, Ca levulinate, dimethyl sulfoxide | 8.0 | 5.1 | 1.71 | 1.39 | 0.98 | 0.85 |
| TC base {Ca levulinate / Mg levulinate} dimethyl sulfoxide | 8.2 | 5.5 | 2.23 | 1.77 | 1.26 | 1.07 |

[1] With water test.
[2] Diluted with water.
[3] Approximate.

EXAMPLE 15

TC base (hexahydrate)—1.17 g.
Calcium lactate—1.26 g.
Dimethyl sulfoxide qs—20 ml.
Apparent pH=8.7.
1:1 aqueous dilution test pH=5.6.

The stability against autoclaving at about 120° C. is illustrated in the following table in which the substantially anhydrous formulations of the present invention are compared with solutions of alkaline earth metal chlorides in propylene glycol and in dimethylsulfoxide and also of tetracycline antibiotic in dimethylsulfoxide but without the complexing alkaline earth metal.

The following table illustrates the stability of other solutions containing a mixture of magnesium and calcium levulinate.

TABLE 3

[Autoclave stability using mixed Mg and Ca levulinate complexes (2:1 of each salt), 50 mg./ml.=TC]

| Sample No. | Dimethyl sulfoxide Apparent pH | Microbiological potency, mg./ml. after various time periods in autoclave (250° F.) | | | |
|---|---|---|---|---|---|
| | | 0 | ½ hr. | 1 hr. | 2 hrs. |
| 1 | 8.48 | 53.6 | 53.2 | 51.8 | 50.6 |
| 2 | 7.93 | 50.6 | 49.4 | 51.4 | 48.8 |
| 3 | 7.58 | 53.2 | 51.8 | 48.8 | 50.0 |
| 4 | 7.13 | 52.6 | 50.6 | 50.8 | 47.2 |

The following table illustrates the rabbit serum levels obtainable with a solution of a number of other tetracycline antibiotics.

TABLE I.—STABILITY OF TC FORMULATIONS IN AUTOCLAVE TEST

[50 mg./ml. TC as HCl]

| Formulation | pH Apparent | pH 1:1 dilution [1] | Microbiological assay TC content (mg./ml.) after $x$ hrs. in autoclave | | | | |
|---|---|---|---|---|---|---|---|
| | | | Prepared | 0 | ½ | 1 | 2 |
| TC base, MgCl$_2$, propylene glycol | 8.5 | 8.8 | 53 | 46 | 44 | 41 | 28 |
| TC base, CaCl$_2$, propylene glycol | 7.5 | 7.6 | 56 | 56 | 49 | 47 | 40 |
| OTC base, MgCl$_2$, propylene glycol [1] | 8.7 | 8.8 | 54 | 54 | 44 | | 26 |
| DMTC base, MgCl$_2$, propylene glycol | 6.2 | 6.5 | 50 | 45 | 43 | 42 | 40 |
| TC base, MgCl$_2$, dimethyl sulfoxide | 4.6 | 4.1 | 51 | 51 | <8 | <8 | <8 |
| TC base, CaCl$_2$, dimethyl sulfoxide | 5.4 | 4.1 | 50 | 48 | 13 | 8 | 4 |
| TC base, dimethyl sulfoxide | 7.9 | 5.9 | 52 | 29 | 0 | 0 | 0 |
| TC HCl, dimethyl sulfoxide | 3.9 | 3.2 | 53 | 53 | 21 | 17 | 7 |
| TC base, Mg levulinate dimethyl sulfoxide | 8.1 | 5.6 | 52 | 52 | 44 | 43 | 43 |
| TC base, Ca levulinate dimethyl sulfoxide | 8.8 | 5.8 | 54 | 54 | 56 | 57 | 57 |
| TC base {Ca levulinate / Mg levulinate} dimethyl sulfoxide | 8.2 | 5.5 | 52.5 | 47 | 44 | 44 | 45 |
| TC base, Ca lactate, dimethyl sulfoxide | 8.7 | 5.6 | 48 | 48 | 50 | 47 | 34 |

[1] With water test.
[2] Oxytetracycline solution, commercial preparation.

TABLE 4

[Dimethyl sulfoxide-magnesium levulinate-TC group antibiotic solutions at 50 mg. (TC/ml. molar ratio of metal to antibiotic=2=1)]

| Antibiotic | pH Apparent | pH 1:1 dilution [1] | Rabbit serum levels (/ml.) after injection anhydrous solution, hours | | | |
|---|---|---|---|---|---|---|
| | | | 1 | 2 | 4 | 7 |
| DMTC (anhydrous) | 8.68 | 5.50 | 1.48 | 1.64 | 1.17 | 0.72 |
| | | | 1.56 | 1.56 | 1.50 | 0.93 |
| DMTC (25 H₂O) | 8.68 | 5.72 | 1.56 | 1.52 | 1.29 | 0.71 |
| | | | 1.40 | 1.20 | 0.90 | 0.66 |
| OTC (anhydrous) | 8.22 | 6.28 | 1.48 | 1.23 | 0.81 | 0.47 |
| | | | 1.46 | 1.44 | 0.93 | 0.44 |
| OTC (25% H₂O) | 8.41 | 5.92 | 1.52 | 1.40 | 0.77 | 0.35 |
| | | | 1.40 | 1.77 | 0.99 | 0.56 |
| TC [2] | | | 1.30 | 1.02 | 0.58 | 0.37 |

[1] With water test.
[2] Powder formulation reconstituted with water. Average of 4.

What is claimed is:

1. A substantially anhydrous solution of a tetracycline antibiotic which is physically and biologically stable and renders high blood levels upon parenteral administration, the solution exhibiting a marked drop in apparent pH on treatment with an equal volume of water, comprising:
   (a) a tetracycline antibiotic complexed with an alkaline earth metal salt of a weak organic acid,
   (b) the complex dissolved in dimethyl sulfoxide, and
   (c) the apparent pH being between 7 and 10.

2. A substantially anhydrous solution according to claim 1 in which the alkaline earth metal salt of a weak organic acid comprises calcium levulinate.

3. A substantially anhydrous solution according to claim 1 in which the alkaline earth metal salt of a weak organic acid comprises magnesium levulinate.

4. A substantially anhydrous solution according to claim 1 in which the alkaline earth metal salt of a weak organic acid comprises calcium ascorbate.

5. A substantially anhydrous solution according to claim 1 in which the antibiotic is tetracycline.

6. A substantially anhydrous solution according to claim 1 in which the antibiotic is chloretetracycline.

7. A substantially anhydrous solution according to claim 1 in which the antibiotic is oxytetracycline.

8. A substantially anhydrous solution according to claim 1 in which the antibiotic is demethyltetracycline.

9. A substantially anhydrous solution according to claim 1 in which the antibiotic is demethylchlortetracycline.

10. A substantially anhydrous solution according to claim 1 in which the alkaline earth metal salt is a mixture of calcium and magnesium levulinates.

References Cited

UNITED STATES PATENTS

| | | | |
|---|---|---|---|
| 2,980,584 | 4/1961 | Hammer | 424—227 |
| 3,044,936 | 7/1962 | Achelis et al. | 424—173 |
| 3,062,717 | 11/1962 | Hammer | 424—227 |

SHEP K. ROSE, Primary Examiner

U.S. Cl. X.R.

424—337; 260—559